United States Patent Office 3,389,093
Patented June 18, 1968

3,389,093
SULFOLENE OXIDE COMPOUNDS AS PROMOTERS FOR POLYMERIZATION OF CYCLIC ETHERS
William R. Busler and Henry L. Hsieh, Bartlesville, Okla., assignors to Phillips Petroleum Company, a corporation of Delaware
No Drawing. Filed Nov. 6, 1964, Ser. No. 409,575
10 Claims. (Cl. 260—2)

ABSTRACT OF THE DISCLOSURE

This invention relates to the polymerization of cyclic ethers in the presence of an organoantimony hexachloride catalyst utilizing a sulfolene oxide compound as a polymerization promoter.

Various types of polar monomers have been polymerized by different techniques to produce polymers having widely varied properties. Friedel-Crafts catalysts such as aluminum chloride, stannic chloride, boron trifluoride, and the like, are well known for the polymerization of cyclic ethers but the products obtained are frequently liquids and low melting waxes which have very limited utility. Trimethylmethylantimony hexachloride, triphenylmethylantimony hexachloride, and the like, can be employed as catalysts for the polymerization of cyclic ethers to give solid products but the conversion rate is lower than desired. It has now been found that when these catalysts are utilized for the polymerization of cyclic ethers, there is a substantial increase in conversion rate and also in monomer conversion if the polymerization is conducted in the presence of a sulfolene oxide compound.

MONOMERS

Cyclic ethers which can be polymerized in accordance with the present process include those which contain from 2 to 8 carbon atoms per molecule. They can be represented by the formula:

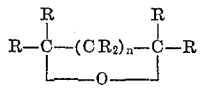

wherein R is hydrogen or an alkyl radical and $n$ is an integer selected from the group consisting of 0, 1 and 2. Illustrative of the compounds that can be polymerized are the following: ethylene oxide, 1,2-epoxypropane, 2-methyl-1,2-epoxypropane, 2,3-epoxybutane, 1,2-epoxybutane, 2-ethyl-1,2-epoxybutane, 3-ethyl-2,3-epoxyhexane, 2,3-dimethyl-2,3-epoxyhexane, 2,3,4-trimethyl-1,2-epoxypentane, oxyacyclobutane, 3-methyloxacyclobutane, 2,4-diethyloxacyclobutane, 3-isopropyloxacyclobutane, 3,3-dimethyloxacyclobutane, 2,2,4,4-tetramethyloxacyclobutane, oxacyclopentane (tetrahydrofuran), 3-n-pentyloxacyclobutane, 3,3-diethyloxacyclobutane, 3-ethyl-3-n-propyloxacyclobutane, and 2,3,3-trimethyloxacyclobutane. Any of these cyclic ethers can be polymerized alone or mixtures of two or more of the ethers can be utilized. While any of the cyclic ethers can be utilized as monomers or comonomers, it is presently preferred to utilize cyclic ethers of the above formula where the R's on the carbon atoms in the ring adjacent the oxygen atoms are hydrogen and more preferably where all of the R's are hydrogen as these monomers have higher activities.

CATALYSTS

Catalysts, or initiators, employed in this invention can be represented by the formula $R_3'$ $CSbCl_6$ wherein R' contains from 1 to 18 carbon atoms and is selected from the group consisting of methyl, aryl, alkaryl, alkenylaryl, alkoxyaryl and mixtures thereof, the total number of carbon atoms in substituents on aryl group not to exceed 6. Specific examples of R' include methyl, phenyl, 1-naphthyl, 2-naphthyl, 2-biphenylyl, 3-biphenylyl, 4-biphenylyl, 4-methylphenyl, 2,3,5-triethylphenyl, 2,4,6-trimethylphenyl, 2,4,6-triethylphenyl, 4-n-hexylphenyl, 3,5-diisopropylphenyl, 3-isopropylphenyl, 4-butoxyphenyl, 2-methoxyphenyl, 2,6-dimethoxyphenyl, 2-butenylphenyl, 2-(3,6-dimethyl)naphthyl, 4-vinylphenyl, 2-propenylphenyl, 1-(4,6-dimethyl)naphthyl, 1-(4-ethoxy)naphthyl, 2-(7-vinyl)naphthyl, 4-(2,3,2',3'-tetramethyl)biphenylyl, 2-(4-isopropenyl)biphenylyl, 3 - (4' - n - hexoxy)biphenylyl groups, and mixtures thereof. They can be prepared by the reaction of antimony pentachloride with a compound represented by the formula $R_3'CCl$. Specific examples of suitable $R_3'CCl$ compounds include triphenylchloromethane, trimethylchloromethane, methyldiphenylchloromethane, dimethylphenylchloromethane, tri(2,4,6-trimethylphenyl)chloromethane, tri(2,4,6 - triethylphenyl)chloromethane, tri(4-n-hexylphenyl)chloromethane, tri(3,5-diisopropylphenyl)chloromethane, methyldi(4-butoxyphenyl)chloromethane, dimethyl-2,6-dimethoxyphenylchloromethane, tri-4-vinylphenylchloromethane, tri-3-(2-propenyl)phenylchloromethane, tri - 2 - ethyl-4-(2-butenyl)phenylchloromethane, tri-1-naphthylchloromethane, tri-2-naphthylchloromethane, methyldi-2-(3,6-dimethyl)naphthylchloromethane, dimethyl-1-(4-ethoxy)naphthylchloromethane, tri-2-(7-vinyl)naphthylchloromethane, tri-2-biphenylylchloromethane, tri-3-biphenylylchloromethane, tri-4-biphenylylchloromethane, tri-4-(2,3,2',3'-tetramethyl)biphenylylchloromethane, tri-2-(4-isopropenyl)biphenylylchloromethane, and tri - 3 - (4'-n-hexoxy)biphenylylchloromethane. The products can be regarded as complex compounds, $R_3'CCl \cdot SbCl_5$. The reaction can be carried out at room temperature or at an elevated temperature. If desired, the reaction can be conducted in the presence of any suitable inert diluent, e.g., a halogenated hydrocarbon such as chloroform or carbon tetrachloride. The reactants are generally employed in a 1:1 mol ratio, although an excess of one or the other can be used. When the two reactants are brought together, a yellow crystalline solid forms which can be separated and purified. When employed as a polymerization initiator, it is generally dispersed in a suitable inert diluent, examples of which include hydrocarbons and ethers.

The quantity of catalyst employed for the polymerization reaction is generally in the range of 0.5 to 10 millimoles per 100 grams of monomeric material. Larger or smaller amounts can be utilized if desired. The catalyst level will be governed to some extent by such factors as the polymerization temperature, the amount of diluent, the monomer or mixture of monomers, and the type of polymer desired. While products ranging from liquids to solids can be produced, solid polymers are of greatest interest.

PROMOTERS

The sulfolene oxide compounds which can be utilized as promoters in accordance with the invention can be represented by the formula:

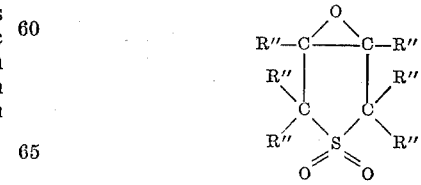

wherein R″ is H or an alkyl radical containing from 1 to 3 carbon atoms. Examples of suitable promoters include:

6-oxa-3-thiabicyclo[3.1.0]hexane-3,3-dioxide (sulfolene oxide), 1-methyl-6-oxa-3-thiabicyclo[3.1.0]hexane-3,3-dioxide,
1,5-dimethyl-6-oxa-3-thiabicyclo[3.1.0]hexane-3,3-dioxide,
2,2-dimethyl-6-oxa-3-thiabicyclo[3.1.0]hexane-3,3-dioxide,
1,2,4,5-tetramethyl-6-oxa-3-thiabicyclo[3.1.0]hexane-3,3-dioxide,
2-ethyl-6-oxa-3-thiabicyclo[3.1.0]hexane-3,3-dioxide,
2,4-diethyl-6-oxa-3-thiabicyclo[3.1.0]hexane-3,3-dioxide,
1,2,5-triethyl-6-oxa-3-thiabicyclo[3.1.0]hexane-3,3-dioxide,
1-n-propyl-6-oxa-3-thiabicyclo[3.1.0]hexane-3,3-dioxide,
2-isopropyl-6-oxa-3-thiabicyclo[3.1.0]hexane-3,3-dioxide,
2,4-di-n-propyl-6-oxa-3-thiabicyclo[3.1.0]hexane-3,3-dioxide,
1,4-diisopropyl-6-oxa-3-thiabicyclo[3.1.0]hexane-3,3-dioxide,
1-methyl-2,2-diethyl-6-oxa-3-thiabicyclo[3.1.0]hexane-3,3-dioxide,
1-ethyl-4-n-propyl-6-oxa-3-thiabicyclo[3.1.0]hexane-3,3-dioxide,
2-methyl-2-ethyl-6-oxa-3-thiabicyclo[3.1.0]hexane-3,3-dioxide,
1,2,2,4,4,5-hexamethyl-6-oxa-3-thiabicyclo[3.1.0]hexane-3,3-dioxide,
1,2,2,4,4,5-hexapropyl-6-oxa-3-thiabicyclo[3.1.0]hexane-3,3-dioxide, and
1,5-di-n-propyl-2,2,4,4-tetramethyl-6-oxa-3-thiacyclo[3.1.0]hexane-3,3-dioxide.

The amount of the promoter utilized is generally in the range of 1 to 100 millimoles per 100 grams of monomeric material. The amount of promoter employed can be varied according to the catalyst, amount of catalyst, monomeric material and particular promoter utilized.

PROCESS CONDITIONS

Polymerization can be conducted with or without an inert diluent. Frequently the only diluent added is that used for dispersion of the catalyst. While it is not mandatory that the catalyst be supplied to the polymerization system in the form of a dispersion, it affords a convenient method for charging it to the reactor. Suitable diluents for catalyst dispersion and polymerization include ethers and aliphatic, cycloaliphatic, and aromatic hydrocarbons, containing up to and including ten carbon atoms per molecule. Examples of specific diluents include benzene, toluene, xylene, ethylbenzene, isobutane, n-pentane, isooctane, n-decane, cyclopentane, methylcyclopentane, dimethylcyclopentane, ethylcyclopentane, cyclohexane, methylcyclohexane, dimethylcyclohexane, tert-butyl methyl ether, ethyl methyl ether, ethyl isopropyl ether, di-n-propyl ether, diisopropyl ether, and mixtures thereof. Polymerization temperature is generally in the range of −100 to 250° F. The pressure is generally maintained in the range of atmospheric to 500 p.s.i.g. and higher. It is usual to operate at a pressure wherein the reaction mixture is maintained substantially in the liquid phase.

Upon completion of the polymerization, the catalyst can be deactivated by the addition of water, alcohol or other suitable deactivating agent. The polymer can be separated from the reaction mixture by any suitable method. One method is to heat the reaction mixture to distill off the diluent, leaving the polymeric product. The polymer can be recovered by coagulation with an alcohol followed by a suitable separation step, for example, filtration or decantation. The polymeric product is useful for the manufacture of film, fibers, molded articles, and coating compositions.

The following example is presented in further illustration of the invention but is not to be construed in undue limitation thereof.

Example

Three runs were made for the polymerization of tetrahydrofuran in the presence of triphenylmethylantimony hexachloride. Sulfolene oxide was employed as a promoter in two of the runs. The third run served as a control. Polymerization recipes were as follows:

| Run | 1 | 2 | 3 |
|---|---|---|---|
| Tetrahydrofuran, parts by weight | 100 | 100 | 100 |
| Triphenylmethylantimony hexachloride, m.m. | 5.3 | 5.3 | 5.3 |
| Sulfolene oxide, parts by weight | ¹5.3 | ²2.6 | ------ |
| Cyclohexane, parts by weight | 41 | 41 | 41 |
| Temperature, °F. | 41 | 41 | 41 |
| Time, hours | 20 | 20 | 20 |
| Conversion, percent | 43 | 49 | 22 |
| Inherent viscosity | 1.64 | 1.41 | 1.64 |

¹ 39.5 mhm.
² 19.4 mhm.

NOTE.—mhm=millimoles per 100 grams monomers.

The polymerization initiator, or catalyst, was prepared by mixing triphenylchloromethane with antimony pentachloride at room temperature (approximately 75° F.) using carbon tetrachloride as the diluent. The reactants were employed in a 1:1 mol ratio. A yellow crystalline complex compound formed, $\phi_3CCl \cdot SbCl_5$ (also designated as $\phi_3CSbCl_6$) which was separated by centrifuging the mixture. It was purified by dissolving in hot methylene chloride followed by precipitation with carbon tetrachloride. Melting point was 240° C. The solid was then dispersed in cyclohexane and charged to the polymerization in this form.

When carrying out the polymerization, tetrahydrofuran was charged first, the reactor was purged with nitrogen, sulfolene oxide was added, and then the catalyst dispersion. At the conclusion of the polymerization, each reaction mixture was poured into methanol to coagulate the polymer which was then separated and dried in a vacuum oven at 60° C. The data show that sulfolene oxide is an effective promoter for this type of polymerization.

Reasonable variation and modification are possible within the scope of the foregoing disclosure and the appended claims to the invention.

We claim.
1. A process for polymerizing at least one monomer represented by the formula:

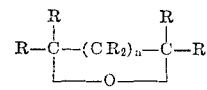

wherein R is selected from the group consisting of hydrogen and alkyl groups, n is 0, 1 or 2 and the number of carbon atoms in said monomer is in the range of 2 to 8, inclusive, carbon atoms per molecule, which comprises contacting said monomer under suitable polymerization conditions with a catalyst represented by the formula:

wherein R′ contains from 1 to 18 carbon atoms and is selected from the group consisting of methyl, aryl, alkylaryl, alkenylaryl, and alkoxyaryl groups and mixtures thereof, the number of carbon atoms in the substituents on an aryl not exceeding 6, in the presence of at least one compound represented by the formula:

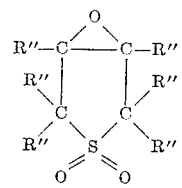

wherein R″ is selected from the group consisting of hydrogen and alkyl radicals having from 1 to 3 carbon atoms.

2. A process in accordance with claim 1 wherein said catalyst is present in an amount in the range of 0.5 to 10 millimoles per 100 grams of said monomer, and said compound is present in an amount in the range of 1 to 100 millimoles per 100 grams of said monomer.

3. A process in accordance with claim 2 wherein said polymerization conditions comprise a temperature in the range of —100° F. to 250° F. and a pressure in the range of atmospheric to 500 p.s.i.g.

4. A process in accordance with claim 1 wherein said compound is 6 - oxa - 3-thiabicyclo[3.1.0]hexane-3,3-dioxide.

5. A process in accordance with claim 1 wherein said monomer is tetrahydrofuran.

6. A process in accordance with claim 5 wherein said compound is 6 - oxa - 3-thiabicyclo[3.1.0]hexane-3,3-dioxide.

7. A process in accordance with claim 6 wherein said catalyst is triphenylmethylantimony hexachloride.

8. A process in accordance with claim 1 wherein the polymerization is conducted in the presence of a diluent.

9. A process in accordance with claim 1 further comprising recovering the resulting polymer.

10. A process in accordance with claim 1 wherein said catalyst is the reaction product of antimony pentachloride and a compound represented by the formula $R'_3CCl$ wherein $R'$ is as previously defined in claim 2.

References Cited

UNITED STATES PATENTS

| | | | |
|---|---|---|---|
| 2,856,370 | 10/1958 | Muetterties | 260—2 |
| 2,906,738 | 9/1959 | Goldberg | 260—2 |

SAMUEL H. BLECH, *Primary Examiner.*

UNITED STATES PATENT OFFICE
CERTIFICATE OF CORRECTION

Patent No. 3,389,093                                                              June 18, 1968

William R. Busler et al.

It is certified that error appears in the above identified patent and that said Letters Patent are hereby corrected as shown below:

Column 4, line 55, in the formula, "R" should read -- $R'$ --. Column 6, line 8, the claim reference numeral "2" should read -- 1 --.

Signed and sealed this 31st day of March 1970.

(SEAL)
Attest:

Edward M. Fletcher, Jr.                                  WILLIAM E. SCHUYLER, JR.
Attesting Officer                                                    Commissioner of Patents